United States Patent [19]

Mc Kee et al.

[11] Patent Number: 6,051,656
[45] Date of Patent: Apr. 18, 2000

[54] PROCESS FOR PRODUCING MOULDING COMPOUNDS MODIFIED WITH ACRYLIC RUBBER AND MOULDING COMPOUNDS THUS OBTAINED

[75] Inventors: Graham Edmund Mc Kee; Bernhard Rosenau, both of Neustadt; Walter Heckmann, Weinheim, all of Germany

[73] Assignee: BASF Aktiengesellschaft, Ludwigshafen, Germany

[21] Appl. No.: 09/155,903

[22] PCT Filed: Apr. 14, 1997

[86] PCT No.: PCT/EP97/01870

§ 371 Date: Oct. 8, 1998

§ 102(e) Date: Oct. 8, 1998

[87] PCT Pub. No.: WO97/39039

PCT Pub. Date: Oct. 23, 1997

[30] Foreign Application Priority Data

Apr. 15, 1996 [DE] Germany ............... 196 14 846

[51] Int. Cl.⁷ ................................................ C08L 51/00
[52] U.S. Cl. .................. 525/242; 523/201; 525/70; 525/293; 525/301; 525/902
[58] Field of Search ................ 525/902, 70, 293, 525/301, 242; 523/201

[56] References Cited

U.S. PATENT DOCUMENTS

| | | | |
|---|---|---|---|
| 3,691,260 | 9/1972 | Mittmacht et al. | 260/876 |
| 4,224,419 | 9/1980 | Swoboda et al. | 525/71 |
| 4,426,499 | 1/1984 | Korte et al. | 525/316 |
| 4,433,102 | 2/1984 | Brandstetter | 525/75 |
| 4,442,263 | 4/1984 | Brandstetter | 525/83 |
| 4,634,734 | 1/1987 | Hambrecht et al. | 525/85 |
| 4,788,253 | 11/1988 | Hambrecht et al. | 525/83 |
| 5,367,029 | 11/1994 | Fischer et al. | 525/301 |
| 5,438,099 | 8/1995 | Fischer et al. | 525/67 |

FOREIGN PATENT DOCUMENTS

| | | |
|---|---|---|
| 1182811 | 2/1962 | Germany . |
| 3149046 | 11/1981 | Germany . |
| 3206136 | 2/1982 | Germany . |
| 3227555 | 7/1982 | Germany . |
| 1519319 | 7/1978 | United Kingdom . |

*Primary Examiner*—Rachel Gorr
*Attorney, Agent, or Firm*—Keil & Weinkauf

[57] ABSTRACT

An elastomeric acrylate copolymer which contains, as polymerized units, comonomers having chemically reactive groups is prepared for the preparation of molding materials having good weathering resistance, improved impact strength and good flow properties. This copolymer is dissolved or swollen in monomers such as styrene and acrylonitrile, forming hard graft shells. After the addition of monomers and/or polymers having chemically reactive groups and, if required, after the addition of a chemically reactive crosslinking agent, the resulting monomer/copolymer mixture is subjected to graft polymerization, which is carried out up to a conversion of more than 15% by weight of the monomers, by thermal or free radical mass or solution polymerization. The molding materials can be used as dulling agents for polymer blends.

10 Claims, No Drawings

PROCESS FOR PRODUCING MOULDING COMPOUNDS MODIFIED WITH ACRYLIC RUBBER AND MOULDING COMPOUNDS THUS OBTAINED

The present invention relates to a process for the preparation of molding materials modified with acrylic rubber by polymerization of monomers forming the graft shell in the presence of an acrylic rubber which is dissolved or swollen in the monomers and contains monomers having chemically reactive groups.

The preparation of rubber-modified molding materials has long been known. Furthermore, the use of elastomeric acrylate polymers having glass transition temperatures of less than 0° C., preferably less than −10° C. (acrylic rubber), for molding materials modified in this manner has been known for almost 40 years. They have improved weathering resistance compared with the molding materials prepared using diene rubbers. In the modified multiphase molding materials, domains of the rubber are embedded in a matrix of a thermoplastic, the domain structure playing a major role in determining the mechanical properties of the resulting molding materials. The toughness of the molding materials results from increased energy absorption during deformation up to fracture, energy being consumed for the formation of microcavities or for the initiation of sliding processes of the matrix polymer chains. The multiphase character is therefore an essential precondition for achieving high impact strengths.

There is still a considerable need for molding materials modified with acrylic rubber and in particular styrene/acrylonitrile copolymers modified with acrylic rubber (ASA molding materials) which have high impact strength and good flow properties and give shaped articles having reduced surface gloss.

The preparation of ASA molding materials in emulsion is described in many patent publications (cf. for example DE-A 19 11 882, DE-A 28 26 925, DE-A 31 29 378, DE-A 31 29 472, DE-A 31 49 046, DE-A 31 49 358, DE-A 32 06 136, DE-A 32 27 555). The disadvantage of this preparation is the necessity of removing assistants during working up of the molding materials, in order to avoid subsequent problems during their processing (discoloration, speck formation, corrosion). In particular, however, the impact strength, tensile strength and gloss properties of shaped articles produced therefrom are unsatisfactory.

DE-B 11 82 811 published more than 30 years ago discloses the polymerization of the acrylate with a crosslinking monomer in solution for the preparation of the acrylic rubber, the monomers styrene and acrylonitrile to be grafted on being added after a conversion of only from 20 to 40% by weight of the monomers and then being polymerized by mass or solution polymerization. Owing to the varying composition in the grafting reaction and because of the incorporation of rubber units into the graft shell by polymerization, this leads to a reduction in the Vicat softening temperature and a deterioration of further mechanical properties of the resulting molding materials.

It is an object of the present invention to prepare molding materials which are modified with acrylic rubber and can be processed to give shaped articles having improved impact strength, good flow properties and reduced surface gloss.

We have found that this object is achieved by a process for the preparation of molding materials modified with acrylic rubber if monomers having chemically reactive groups are incorporated into the acrylic rubber by polymerization, the completely polymerized acrylic rubber is dissolved or thoroughly swollen in the monomers forming the graft shell, and monomers and/or polymers which contain chemically reactive groups capable of reacting with the chemically reactive groups contained in the acrylic rubber (A2) or capable of being linked with these with the aid of an added crosslinking agent (AMV) are added to the mixture. The added crosslinking agent (AMV) may react both with the chemically reactive groups in the acrylic rubber (A2) and with the chemically reactive groups of the added monomer and/or polymer. The graft polymerization can then be carried out in one or more stages, at least the first stage of the polymerization being carried out, to a conversion of more than 15, preferably from 20 to 40, % by weight of the monomers, by (preferably) thermal or free radical mass polymerization or by solution polymerization.

The present invention thus relates to a process for the preparation of a molding material (A) modified with acrylic rubber, by (a) polymerization of a mixture (A2M) of
(a1) at least one monomer of the formula $$CH_2=CR^1-COOR^2$$

where $R^1$ is hydrogen or methyl and $R^2$ is alkyl of 1 to 32 carbon atoms,
(a2) at least one copolymerizable olefinically unsaturated monomer (A2m2) which contains a chemically reactive group (A2m2x) and
(a3) if required, at least one further copolymerizable olefinic unsaturated monomer (A2m3), the sum of the amounts of the monomers (A2m2) and (A2m3) being less than the amount of the monomer (A2m1), to give an acrylic rubber (A2) having a glass transition temperature of less than 0° C., (b) dissolution or swelling of the completely polymerized acrylic rubber (A2), with or without the addition of an inert solvent, in one or more olefinically unsaturated monomers (A1m) which form a hard graft shell (A1) and whose polymers or copolymers have a glass transition temperature of at least +20° C., and addition of a minor amount of a monomer (A1mf) and/or of a polymer (A1Pf) compatible or partially compatible with the monomers (A1m) to the monomers (A1m), (A1mf) and (A1Pf) containing at least one chemically reactive group which is capable of reacting with the chemically reactive groups (A2m2x) of the acrylic rubber (A2) or which, with the aid of a crosslinking agent (AMV) added to the mixture (AM), permits coupling of the chemically reactive group to a chemically reactive group (A2m2x) of the acrylic rubber (A2), and (c) graft polymerization of the resulting mixture (AM) in one or more stages to give a molding material (A), at least the first stage of the polymerization of the mixture (AM) being carried out, up to a conversion of more than 15% by weight of the monomers, by thermal or free radical mass or solution polymerization.

The present invention furthermore relates to molding materials prepared by the novel process and to their use as dulling agents.

Although the novel process is described as 3-stage process for the sake of clarity, the process is however also used when only the 3rd stage is carried out, ie. the monomers (A1m) are polymerized as stated in the presence of the dissolved or swollen defined acrylic rubber (A2).

Alkyl acrylates and/or alkyl methacrylates (A2ml) suitable for the preparation of the acrylic rubber (A2) are those of the formula $CH_2=CR^1—COOR^2$, where $R^1$ is hydrogen or methyl and $R^2$ is alkyl of 1 to 32, in particular 1 to 12, carbon atoms. Acrylates of a linear or at most singly branched alkyl alcohol of 4 to 12 carbon atoms are preferred. Esters of n-butanol and of 2-ethylhexyl alcohol are preferred. For a given content of certain monomers (A2m2) and (A2m3), the glass transition temperature $T_g$ of the resulting acrylic rubber (A2) can be established by the choice of acrylates, methacrylates or mixtures thereof, and the glass transition temperature $T_g$ should be less than 0° C., in particular less than −100° C., preferably less than −200° C. This establishment of the glass transition temperature is based on the fact that the glass transition temperature of acrylate and methacrylate polymer initially decreases with increasing length of the side chains, passes through a minimum at $C_7$-alkyl acrylate or $C_{10}$-alkyl methacrylate and then increases again. In general, the content of alkyl methacrylate or acrylate in the mixture (A2M) is at least 50, preferably at least 80,% by weight, based on the total amount of monomers in the mixture (A2M).

The mixture (A2M) furthermore contains at least one copolymerizable olefinic unsaturated monomer (A2m2), which contains a chemically reactive group (A2m2x). Examples of such chemically reactive groups are epoxy, amino, amido, hydroxyl, carboxylic anhydride and carboxyl groups. Monomers of this type are known and are commercially available. Examples of comonomers (A2m2) are unsaturated glycidyl esters and glycidyl ethers, such as glycidyl (meth)acrylate, aminoalkyl (meth)acrylates and aminoalkyl (meth)acrylamides, such as N-2-aminoethylmethacrylamide or aminohydroxypropyl methacrylate, 2-hydroxyethyl (meth)acrylate, (meth)acrylamide, N-hydroxymethyl (meth)acrylamides, esters and ethers thereof, such as N-methoxymethyl (meth)acrylamide, maleic anhydride, acrylic acid, methacrylic acid and crotonic acid.

The mixture (A2M) contains the monomers (A2m2) in general in an amount of from 1 to 25, in particular from 3 to 15, % by weight, based on the total amount of monomers in the mixture (A2M) used for the preparation of acrylic rubber.

For the preparation of acrylic rubber (A2), further copolymerizable olefinically unsaturated monomers (A2m3) may be present in a small amount, the sum of the amounts of the monomers (A2m2) and (A2m3) being in general less than the amount of alkyl acrylate and/or alkyl methacrylate (A2m1). Such further comonomers (A2m3) are in particular monomers having at least two olefinically unsaturated double bonds, such as allyl methacrylate or acrylate, 1,4-butanediol dimethacrylate or diacrylate, divinylbenzene, triallyl cyanurate or dihydrodicyclopentadienyl methacrylate or acrylate. Preferred among these are monomers having nonconjugated double bonds, in particular allyl methacrylate and acrylate and dihydrodicyclopentadienyl methacrylate and acrylate. The mixture (A2M) contains from 0 to 20, in particular from 0.3 to 15, preferably from 0.3 to 12, % by weight, based on the total amount of monomers in the mixture (A2M), of these crosslinking monomers or monomers supporting the grafting of the monomers (bn). The content of these monomers in the mixture (A2M) depends to a great extent on the reactivity of the two C=C double bonds of the monomers. If both are very reactive and if both are incorporated into the polymer chain during the polymerization of the mixture (A2M), then increasing crosslinking of the acrylic rubber copolymer (A2) takes place as concentrations of monomers having at least 2 C=C double bonds increase. If, on the other hand, only one C=C double bond is readily polymerizable, as when dihydrodicyclopentadienyl acrylate is used, the difunctional monomer can then be used in a larger amount and results in increased grafting of the monomers (A1m) onto the acrylic rubber (A2) in the polymerization of the mixture (AM) in stage c) of the process.

Increased grafting of the acrylic rubber (A2) can also be achieved by additional use of a comonomer having a group which forms free radicals as a result of thermal decomposition, for example comonomers having peroxy or azo groups. Examples of such comonomers are tert-butyl 3-isopropenylcumyl peroxide, tert-butyl peroxycrotonate and tert-butyl monoperoxymaleate. In the case of the last monomers, the preferred amount is from 0.3 to 5% by weight of the monomers in the mixture (A2M).

The copolymerization of the monomers (A2m1) with (A2m2) and, if required, (A2m3) can be carried out in a known manner, in particular as solution or emulsion polymerization, and is preferably initiated with free radical initiators. The chemically reactive groups (A2m2x) of the monomers (A2m2) should be substantially maintained.

After completion of the polymerization and any necessary removal of residual monomers or isolation of the acrylic rubber (A2), this is, according to the invention, dissolved or at least thoroughly swollen in the monomers (A1m) subsequently forming the graft shell and possibly the polymer matrix, with or without the addition of required amounts of a suitable inert solvent or solvent mixture and with stirring and/or heating of the mixture. In particular, the amount of added solvent is not more than 50% by weight of the sum of the amounts of monomers (A1m) and acrylic rubber (A2).

Examples of suitable monomers (A1m) which subsequently essentially form the harder graft shell are styrene, α-methylstyrene, styrenes alkylated on the nucleus and preferably having $C_1$–$C_4$-alkyl radicals, acrylonitrile, methacrylonitrile, acrylamide, methacrylamide, N-phenylmaleimide and alkyl acrylates and methacrylates where the alkyl radicals have 1 to 4 carbon atoms, in particular methyl methacrylate. Monomers and monomer mixtures which give a polymer or copolymer having a glass transition temperature of more than +20° C., preferably more than +50° C., are used. A mixture of an alkenylbenzene monomer, such as styrene, and acrylonitrile, in which the alkenylbenzene monomers are preferably present in an amount of from 50 to 80% by weight and acrylonitrile in an amount of from 20 to 50% by weight, based on the amount of the mixture, is particularly preferably used as monomers (A1m).

The amount of monomers (A1m) in the mixture (AM) depends in particular on the desired content of acrylic rubber (A2) in the resulting molding materials (A). In general, the amount by weight of the monomers (A1m) in the mixture (AM) is from ⅔ to about 100, in particular from 3 to 20, times the amount of acrylic rubber (A2) present.

Before, during or after the dissolution or swelling of the acrylic rubber (A2) in the monomers (A1m), a monomer (A1mf) and/or a polymer (A1Pf) compatible or partially compatible with the monomers (A1m), each of which contains at least one chemically reactive group which is capable of reacting with the chemically reactive groups (A2m2x) introduced by the comonomer (A2m2) into the acrylic rubber (A2) or which, with the aid of an added polyfunctional crosslinking agent (AMV), permits coupling with the chemically reactive groups (A2m2x) of the acrylic rubber (A2), is mixed with these monomers (A1m) in a minor amount, in particular an amount of from 1 to 25% by weight of the amount of the monomers (A1m) in the mixture (AM).

Thus, by adding a crosslinking agent (AMV) having at least two identical chemically reactive groups which can react with the chemically reactive groups in the acrylic rubber (A2) and the chemically reactive groups in the monomer (A1mf) and/or polymer (A1Pf), in particular during the polymerization reaction, the acrylic rubber (A2) can be bonded or crosslinked with the monomers (A1mf) and/or polymers (A1Pf), which leads to a higher degree of grafting. A suitable crosslinking agent (AMV) is, for example, a diamine or polyamine having at least two primary or secondary amino groups, such as alkylenediamines, preferably ethylenediamine.

If the acrylic rubber (A2) contains, for example, epoxy groups, it is useful to add monomers (A1mf) and/or polymers (A1Pf) which contain, for example, amino (preferably primary or secondary amino), hydroxyl, amido, carboxyl or carboxylic anhydride groups, eg. β-hydroxyethyl (meth) acrylate, copolymers thereof, aminoalkyl (meth) acrylamides, copolymers thereof, maleic anhydride and copolymers thereof and (meth)acrylic acid and copolymers thereof.

If the acrylic rubber (A2) contains, for example, primary or secondary amino groups, it is useful to add to the mixture (AM) monomers (A1mf) and/or polymers (A1Pf) which contain, for example, epoxy, carboxylic anhydride or carboxyl groups, eg. glycidyl (meth)acrylate, glycidyl (meth) acrylate copolymers, maleic anhydride and maleic anhydride copolymers, etc. Relevant polymer literature provides sufficient information for the choice of suitable reactants.

The amount of chemically reactive monomers (A1mf) to be added and/or chemically reactive polymers (A1Pf) depends, inter alia, on the proportion of chemically reactive groups therein and on the amount of the acrylic rubber (A2) and the calculated amount of the epoxy, amino, carboxylic anhydride or carboxyl groups bonded therein. Depending on the type and reactivity of these groups in the acrylic rubber (A2) and in the monomers (A1mf) or polymer (A1Pf), the molar concentration of the chemically reactive groups in the added monomer (A1mf) and/or polymer (A1Pf) should correspond at least to the calculated molar concentration of the epoxy, amino, hydroxyl, amido, carboxylic anhydride or carboxyl groups in the acrylic rubber (A2) or should substantially exceed said concentration.

The polymerization of the monomers (A1m) in the presence of the acrylic rubber (A2) dissolved or swollen in the monomers (A1m) and, if required, added solvent and in the presence or absence of the polymer (A1Pf) (mixture AM) is preferably carried out as thermal or free radical polymerization at from room temperature to 200° C., in particular from 50 to 160° C. The polymerization may be carried out in one or more stages. At least the first stage of the polymerization is carried out to a conversion of more than 15, preferably from more than 20 to 40, % by weight of monomers, by thermal or free radical mass polymerization or by solution polymerization.

After this first stage, the polymerization can, if desired, then be continued and completed by another polymerization method, advantageously by suspension polymerization in the presence of known initiators and stabilizers for the suspension polymerization.

The molding material (A) obtained after the polymerization of the mixture (AM), which constitutes or includes graft polymerization of monomers (A1m) onto the acrylic rubber (A2), contains in general from 1 to 60, in particular from 5 to 40, % by weight of the acrylic rubber (A2). The upper limit of the content of acrylic rubber (A2) arises from the necessity of the molding material (A) having sufficient strength in spite of the embedded domains of the rubber. The lower limit is determined essentially by the fact that sufficient energy is absorbed on deformation of the molding material.

The molding materials (A) prepared according to the invention have improved impact strength and notched impact strength and good flow behavior. Shaped articles produced therefrom furthermore have the major advantage that their surfaces are generally dull or almost dull. They can also be advantageously used as dulling agents for other compatible or partly compatible polymer molding materials.

The examples and comparative experiments which follow illustrate the invention.

Parts and percentages are by weight unless stated otherwise.

The polyvinylpyrrolidone used was from BASF AG and had a K value of 90 (according to Fikentscher, Celluloschemie 13(1932)58).

The polyvinyl alcohol used (Moviol® 30-92 from Hoechst AG) had a degree of hydrolysis of 92 mol% and the 4% aqueous solution had a viscosity of 30 mPa.s at 20° C.

The values for the impact strength in $kJ/m^2$ were determined according to DIN 53 453-K, 5/75 edition.

The values for the notched impact strength in $kJ/m^2$ were determined according to DIN 53 4534-K, 5/75 edition.

The impact strength and notched impact strength were measured using small standard bars which were injection molded at a plastics melt temperature of 240° C. and a mold temperature of 60° C.

The flow behavior and hence the processability were assessed on the basis of the melt volume index in ml/10 min, which was measured according to DIN 53 735 at 200° C. and under a load of 21.6 kg.

The gloss was assessed using 2 mm thick circular disks which were injection molded at a plastics melt temperature of 220° C. and a mold temperature of 60° C.

The glass transition temperature was determined by means of the DSC method (K. H. Illers, Makromolekulare Chemie 127 (1969), 1).

Example 1

(a) Preparation of the acrylic rubber (A2) (according to the invention 1868 g of toluene were introduced into a flask and heated to 75° C. under nitrogen and with stirring, and 41 g of a monomer mixture comprising 89.7% of n-butyl acrylate (A2m1), 2.3% of allyl methacrylate (A2m3) and 8% of glycidyl methacrylate (A2m2), and 41 mg of azobisisobutyronitrile as an initiator, were then added. 787 g of a monomer mixture of the same composition and 777 mg of azobisisobutyronitrile were then metered in over the following 4 hours. After a polymerization time of a further 4 hours, the polymerization batch was cooled and was stabilized with 19 g of octadecyl 3-(3,5-di-tert-butyl-4-hydroxyphenyl) propionate as an antioxidant. The conversion was 92%.

b)+c) Preparation of a molding material containing the acrylic rubber (A2), without the concomitant use of monomer (A1mf) or polymer (A1Pf)

(comparative experiment)

The toluene and any residual monomer present from stage a) were removed under reduced pressure in a rotary evaporator and were replaced by a certain amount of styrene, after which acrylonitrile was added in an amount such that a mixture of 69.2% of styrene (A1m1), 23% of acrylonitrile (A1m2) and 7.8% of acrylic rubber (A2) formed. In this manner, the acrylic rubber (A2) was dissolved in a styrene/ acrylonitrile mixture. 1923 g of this solution were then introduced into a 5 liter steel kettle and were heated to 123°

C. with stirring. At a monomer conversion of 20%, 1.49 g of tert-butyl mercaptan and 2.31 g of octadecyl 3-(3,5-di-tert-butyl-4-hydroxyphenyl)propionate, as an antioxidant, were added. At a monomer conversion of 33%, 1.9 g of dicumyl peroxide, 1900 g of water, 20 g of polyvinylpyrrolidone, 1.0 g of tetrasodium diphosphate and 59.8 g of a 10% strength aqueous polyvinyl alcohol solution were added. The polymerization batch was polymerized to completion for 3 hours at 110° C., for 3 hours at 130° C. and for 6 hours at 140° C. It was then cooled, and the polymer was filtered off and dried. The properties of the conventional molding material are shown in Table 1.

Example 2 (comparative experiment)

The procedure was as in Example 1, except that a conventional acrylic rubber comprising 97.7% of n-butyl acrylate and 2.3% of allyl methacrylate was used. The properties of the conventionally prepared molding material are shown in Table 1.

Example 3 (according to the invention)

The procedure was as in Example 1, except that 7.8% of the stated monomer mixture comprising styrene (A1m1) and acrylonitrile (A1m2) was replaced by a copolymer of 73.5% of styrene, 24.5% of acrylonitrile and 2% of maleic anhydride (polymer A1Pf). The properties of the molding material prepared according to the invention are shown in Table 1.

Example 4 (according to the invention)

The procedure was as in Example 1, except that 10.4% of the stated monomer mixture comprising styrene (A1m1) and acrylonitrile (A1m2) were replaced by a copolymer of 73.5% of styrene, 24.5% of acrylonitrile and 2% of maleic anhydride (polymer A1Pf). The properties of the molding material prepared according to the invention are shown in Table 1.

Example 5 (according to the invention)

The procedure was as in Example 4, except that 11% of the styrene/acrylonitrile monomer mixture (A1m) were replaced by the styrene/acrylonitrile/maleic anhydride copolymer (polymer A1Pf) stated there. The properties of the molding material prepared according to the invention are shown in Tabe 1.

TABLE 1

| Example | Comparison | | according to the invention | | |
|---|---|---|---|---|---|
| | 1 | 2 | 3 | 4 | 5 |
| Impact strength 23° C. (kJ/m$^2$) | 22 | 25 | 37 | 35 | 35 |
| Notched impact strength 23° C. (kJ/m$^2$) | 1.8 | 1.8 | 2.6 | 2.1 | 2.9 |
| Melt volume index (ml/10 min.) | 5.1 | 3.0 | 7.4 | 14.0 | 8.3 |
| Gloss | | | dull | dull | dull |

Example 6 (according to the invention)

(a) Preparation of the acrylic rubber (A2)

1685 g of toluene were introduced into a flask and heated to 75° C. under nitrogen, and 5% each of feed 1 and 2 below were then initially taken with stirring.

| Feed 1 | Feed 2 |
|---|---|
| 750 g n-butyl acrylate (A2m1) | 818 mg of azobisisobutyronitrile (AIBN) |
| 17.6 g allyl methacrylate (A2m3) | 40 ml of toluene |
| 60 g hydroxypropyl methacrylate (A2m2) | 40 ml acetone |

The remainder of feeds 1 and 2 was then metered in continuously in the course of the next 4 hours. After a total polymerization time of 8 hours at 75° C., the batch was cooled and was stabilized with 0.12% (based on the amount of monomers) of octadecyl 3-(3,5-di-tert-butyl-4-hydroxyphenyl)propionate. The conversion was 95%.

b)+c) Preparation of the rubber-modified molding material

The toluene and acetone and any residual monomer present from batch a) were removed under reduced pressure in a rotary evaporator and replaced by monomers so that a mixture (AM) of 1272 g of styrene (A1m1), 424 g of acrylonitrile (A1m2) and 77 g of maleic anhydride (A2m2) resulted, in which 150 g of the acrylic rubber (A2) from stage a) were present in solution. This mixture (AM) was introduced into a steel kettle and heated to 123° C. with stirring.

After a conversion of about 20%, 1.49 g of tert-dodecyl mercaptan 5 and 2.31 g of octadecyl 3-(3,5-di-tert-butyl-4-hydroxyphenyl)propionate, as an antioxidant, and, after a total conversion of 30%, 1.93 g of dicumyl peroxide were added. After a total conversion of 33.9% of the monomers, 1900 g of water, 2.0 g of tetrasodium diphosphate and 20 g of polyvinylpyrrolidone and 59.8 g of a 10% polyvinyl alcohol solution were added. This mixture was then polymerized to completion for 3 hours at 110° C., for a further 3 hours at 130° C. and for a further 6 hours at 140° C.

The mixture was then cooled and the polymer was filtered off and dried. It was possible to produce shaped articles having a dull surface from the resulting rubber-modified molding material (A).

Example 7 (according to the invention)

1753 g of cyclohexane were introduced into a flask and heated to 75° C. under nitrogen, and 5% each of feeds 1 and 2 stated below were then initially taken with stirring.

| Feed 1 | Feed 2 |
|---|---|
| 750 g n-butyl acrylate (A2m1) | 818 mg azobisisobutyronitrile (AIBN) |
| 6.51 g allyl methacrylate (A2m3) | 40 ml toluene |
| 22.5 g maleic anhydride (A2m2) | 40 ml acetone |

The remainder of feeds 1 and 2 was then metered in continuously in the course of 4 hours and, after a total polymerization time of 8 hours, the batch was cooled and was stabilized with 0.12 g of octadecyl 3-(3,5-di-tert-butyl-4-hydroxyphenyl)propionate as an antioxidant. The monomer conversion was 95%.

b)+c) Preparation of the rubber-modified molding material

The acetone, cyclohexane, toluene and any residual monomer present were removed under reduced pressure on a rotary evaporator and then replaced with monomers so that a mixture of 150 g of the acrylic rubber (A2) from a) was present in a dissolved or swollen form in a mixture of 1247 g of styrene (A1m1) and 416 g of acrylonitrile (A1m2). 110 g of a copolymer of 72% of styrene, 24% of acrylonitrile and 4% of maleic anhydride, as reactive polymer (A1Pf), and then 9.3 g of ethylenediamine as crosslinking agent (AMV) were added to this mixture. The resulting mixture (AM) was introduced into a steel kettle and heated to 123° C. with stirring. After a conversion of about 20% of the monomers, 1.49 g of tert-dodecyl mercaptan and 2.31 g of octadecyl 3-(3,5-di-tert-butyl-4-hydroxyphenyl)propionate, as an antioxidant, and, after a conversion of 30% of the monomers, 1.7 g of dicumyl peroxide were added. After a total conversion of 33%, 1900 g of water, 2.0 g of tetrasodium diphosphate, 20 g of polyvinylpyrrolidone and 20 g of a 10% strength aqueous polyvinyl alcohol solution were added and the mixture was polymerized to completion for 3 hours at 110° C., for 3 hours at 130° C. and for a further 6 hours at 140° C. It was possible to produce shaped articles having a dull surface from the resulting rubber-modified molding materials.

We claim:

1. A process for the preparation of a molding material (A) modified with acrylic rubber, by
   (a) polymerization of a mixture (A2M) of
      (a1) at least one monomer (A2m1) of the formula $$CH_2=CR^1-COOR^2$$

where $R^1$ is hydrogen or methyl and $R^2$ is alkyl of 1 to 32 carbon atoms,
      (a2) at least one copolymerizable olefinically unsaturated monomer (A2m2) which contains a chemically reactive group (A2m2x) and
      (a3) optionally at least one further copolymerizable olefinic unsaturated monomer (A2m3), the sum of the amounts of the monomers (A2m2) and (A2m3) being less than the amount of the monomer (A2m1), to give an acrylic rubber (A2) having a glass transition temperature of less than 0° C.,
   (b) dissolution or swelling of the completely polymerized acrylic rubber (A2), with or without the addition of an inert solvent, in one or more olefinically unsaturated monomers (A1m) which form a hard graft shell (A1) and whose polymers or copolymers have a glass transition temperature of at least +20° C., and addition of a minor amount of a monomer (A1mf) or of a polymer (A1Pf) compatible or partially compatible with the monomers (A1m) to the monomer (A1m), (A1mf) and (A1Pf) containing at least one chemically reactive group which is capable of reacting with the chemically reactive groups (A2m2x) of the acrylic rubber (A2) or which, with the aid of a crosslinking agent (AMV) added to the mixture (AM), permits coupling of the chemically reactive group to a chemically reactive group (A2m2x) of the acrylic rubber (A2), and
   (c) graft polymerization of the resulting mixture (AM) in one or more stages to give a molding material (A), at least the first stage of the polymerization of the mixture (AM) being carried out, up to a conversion of more than 15% by weight of the monomers, by thermal or free radical mass or solution polymerization.

2. A process as claimed in claim 1, wherein the copolymerizable olefinically unsaturated monomer (A2m2) in the mixture (A2M) contains an epoxy, amino, amido, hydroxyl, carboxylic anhydride or carboxyl group.

3. A process as claimed in claim 1, wherein the mixture (AM) contains, in addition to an acrylic rubber (A2) having chemically reactive groups and the monomers (A1m), at least one monomer (A1mf) or polymer (A1Pf) having a chemically reactive group which is capable of reacting with the chemically reactive groups (A2m2x) introduced by the comonomer (A2m2) into the acrylic rubber (A2).

4. A process as claimed in claim 1, wherein the acrylic rubber (A2) contains epoxy groups and the chemically reactive monomer (A1mf) or chemically reactive polymer (A1Pf) in the mixture (AM) contains primary or secondary amino, hydroxyl, amido, carboxylic anhydride or carboxyl groups.

5. A process as claimed in claim 1, wherein the mixture (AM) contains a crosslinking agent (AMV) having at least two chemically reactive groups which are capable of reacting with the chemically reactive groups in the acrylic rubber (A2) and with the chemically reactive groups of the monomer (A1mf) or of the polymer (A1Pf).

6. A process as claimed in claim 1, wherein the mixture (AM) contains, as crosslinking agent (AMV), a diamine or polyamine having at least two primary or secondary amino groups.

7. A process as claimed in claim 1, wherein styrene, acrylonitrile, methyl methacrylate or a mixture thereof is used as monomer (A1m) in the mixture (AM).

8. A process as claimed in claim 1, wherein the amount of the monomer (A2m2) is from 1 to 25% by weight of the total amount of the monomers in the mixture (A2M).

9. A process as claimed in claim 1, wherein the mixture (A2M) contains, as monomer (A2m3), a monomer having two nonconjugated C=C double bonds in an amount of from 0.1 to 12% by weight of the total amount of the monomers in the mixture (A2M).

10. A molding material modified with acrylic rubber prepared by a process consisting essentially of one-stage or multistage graft polymerization of a mixture (AM) consisting essentially of
   (i) an acrylic rubber (A2) which has a glass transition temperature of less than 0° C. and is a completely polymerized copolymer (A2) comprising
      (a1) at least one monomer (A2m1) of the formula $$CH_2=CR^1-COOR^2$$

where $R^1$ is hydrogen or methyl and $R^2$ is alkyl of 1 to 32 carbon atoms,
      (a2) an olefinically unsaturated monomer (A2m2) having a chemically reactive group (A2m2x) and
      (a3) optionally, at least one further olefinically unsaturated monomer in an amount which is less than the amount of monomer (A2ml) and
   (ii) one or more olefinically unsaturated monomers (A1m) which form the hard graft shell and with which was mixed from 1 to 25%, based on the weight of said monomers, of a monomer (A1mf) or polymer (A1Pf) which contains at least one chemically reactive group which is capable of reacting with chemically reactive groups of the acrylic rubber (A2) or, with the aid of an added crosslinking agent (AMV), permits coupling with the chemically reactive groups (A2m2x) of the acrylic rubber (A2),
   (iii) at least the first stage of the graft polymerization of the mixture (AM), after dissolution or swelling of the acrylic rubber (A2) in the monomers (A1m) and, optionally , after the addition of a crosslinking agent (AMV), being carried out, to a conversion of more than 15% by weight of monomers, by thermal or free radical mass or solution polymerization.

* * * * *